United States Patent [19]

Ball

[11] Patent Number: 5,111,326
[45] Date of Patent: May 5, 1992

[54] INTEGRATED KERR SHUTTER AND FIBER LASER OPTICAL MODULATION

[75] Inventor: Gary A. Ball, Newington, Conn.

[73] Assignee: United Technologies Corporation, Hartford, Conn.

[21] Appl. No.: 691,264

[22] Filed: Apr. 25, 1991

[51] Int. Cl.⁵ .................. G02B 6/26; H01S 3/10
[52] U.S. Cl. .................. 359/244; 359/239; 359/258; 385/1; 385/11; 369/110
[58] Field of Search ............ 359/239, 244, 258; 372/27; 385/1, 11; 369/110

[56] References Cited

U.S. PATENT DOCUMENTS

| | | | |
|---|---|---|---|
| 4,761,050 | 8/1988 | Byron | 385/1 |
| 4,983,024 | 1/1991 | Boothroyd et al. | 359/258 |
| 5,003,268 | 3/1991 | Tsuchiya | 372/27 |
| 5,012,474 | 4/1991 | White et al. | 372/27 |

OTHER PUBLICATIONS

Kitayama et al., "Optical Sampling . . . Fiber Kerr Shutter", Appl. Phys. Lett., vol. 46, #7, pp. 623–625, Apr. 1, 1985.
Penty et al., "Nonlinear Two Moded, Single Fiber . . . ", Elect Lett., vol. 24, #21, pp. 1338–1339, Oct. 13, 1988.
Davisian et al., "Diode Laser Pumped Kerr . . . Fibre", 14 ECOG, pp. 131–134, vol. 1, Sep. 15, 1988.
Morioka et al., "Demonstration of . . . Optical Fibers", Photonic Switching II, Apr. 14, 1990, Springer-Verlag.
Penty et al., "Optically Induced Kerr . . . Pump Powers", IBB Colloquium on Nonlinear Optical Waveguides, Dig. 88, pp. 8/1–6, Jun. 2, 1988.

Primary Examiner—Nelson Moskowitz

[57] ABSTRACT

An optical modulation source provides a pulsed optical signal 44 by coupling a pulsed optical pump signal 13 polarized along one axis of a polarization preserving fiber 24 having a wavelength λp and a continuous-wave (CW) probe signal 54 polarized partially along the pump polarization axis having the desired output wavelength λs provided by a laser 52, into one end 22 of a polarization preserving fiber 24. The pump signal is decoupled at the output end 26 of the fiber 24 and used to drive the laser 52 which provides the CW probe signal 54. The pulsed pump signal 13, when present, changes the polarization of the probe signal 54 by the optical Kerr effect. The probe signal is decoupled at the output end 26 of the fiber 24 and passed through an analyzer 38 yielding an output probe signal 44 which exists only when the pump signal is present (or alternatively, when absent), thereby providing a probe signal 44 having a wavelength λs of the probe signal and a pulse rate (1/T) of the pump signal.

9 Claims, 2 Drawing Sheets

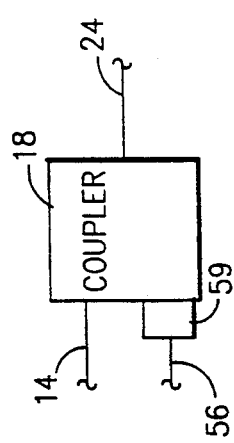
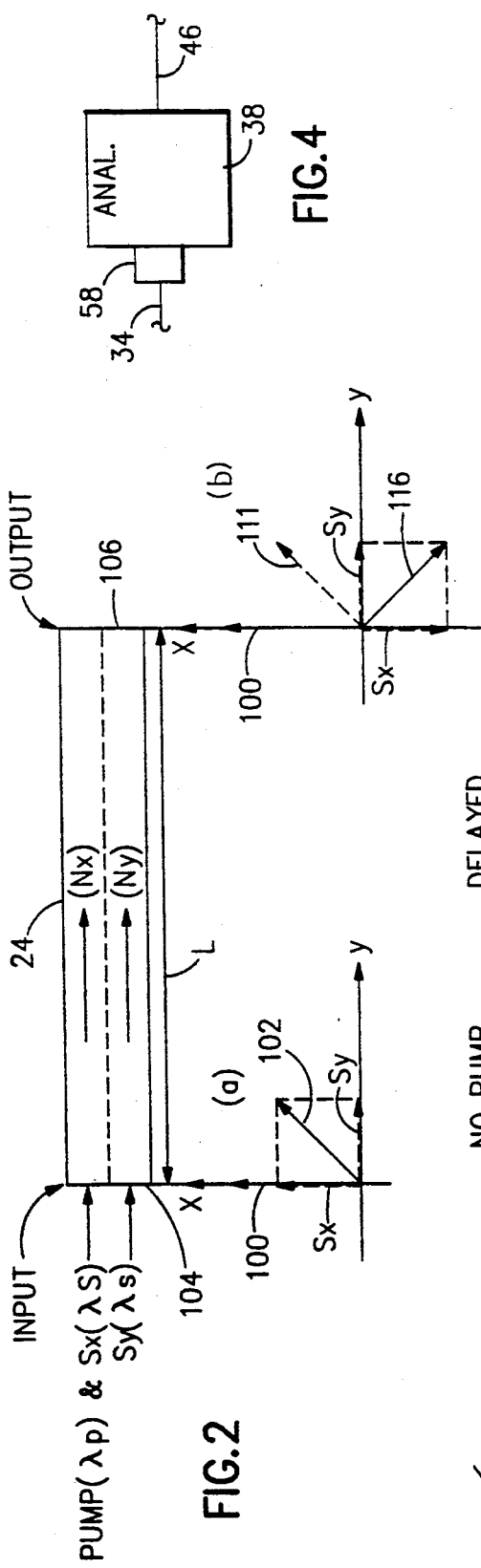
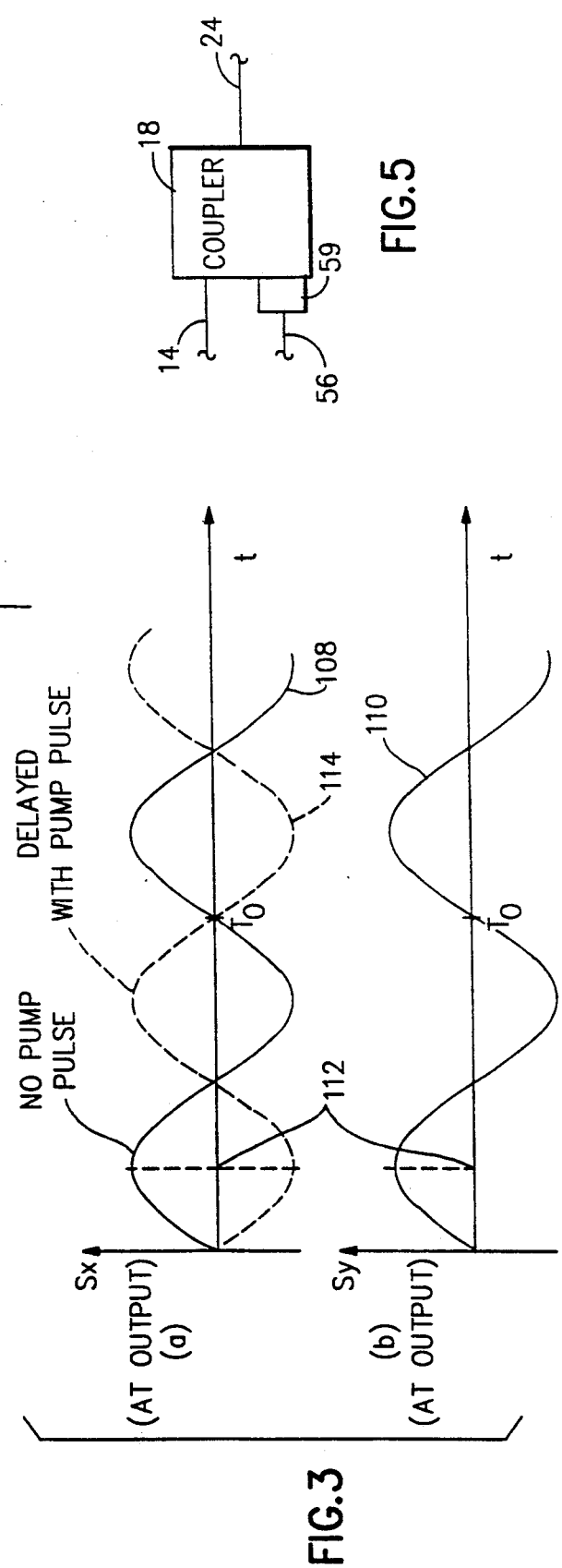

INTEGRATED KERR SHUTTER AND FIBER LASER OPTICAL MODULATION

TECHNICAL FIELD

This invention relates to optical modulation and more particularly to a high speed, modulated optical source.

BACKGROUND ART

It is known in the art that an optical Kerr shutter may be used to provide an optically sampled optical "probe" output signal of a given wavelength ($\lambda s$) from a continuous wave (CW) optical "probe" input signal with the same wavelength ($\lambda s$) and an optical "pump" input signal of a different wavelength ($\lambda p$) pulsed at the desired sample frequency.

The Kerr shutter, as is known, operates on the principle of the optical Kerr effect. The optical Kerr effect is a property of some materials that causes a change in the index of refraction of the material in the presence of a light beam (or pump). The Kerr shutter uses this property to induce birefringence, i.e., non-uniform refractive indices along different axes of an optical waveguide medium, between two axes of propagation by injecting an optical pump. The pump alters the index of refraction (n) in the direction it is polarized while it is present (due to the Kerr effect). In an all-optical Kerr shutter, the pump signal and the probe signal (referred to hereinafter as "pump" and "probe") are combined by known optical means, and launched into one end of a polarization preserving (or maintaining) optical fiber (i.e., prevents the components along the fiber axes from scrambling). Typically, the pump has a polarization direction along one axis and the probe has a polarization direction 45° from the pump. More specifically, the pump typically has a polarization along the x axis and the probe has a polarization of 45° between the positive x axis and the positive y axis which decomposes into components of equal magnitude along the x and y axes, and the pump is pulsed at a given frequency. When the pump pulse is not present, the components of the probe along the x and y axes propagate through the waveguide medium (polarization preserving fiber) having the same index of refraction (n) along both axes. Thus, the signals exit the output end of the fiber exhibiting no phase shift between them (as they were when they entered the fiber).

An analyzer (or polarizer) is typically placed at the output end of the fiber to monitor the waves exiting the fiber and provides an optical output signal indicative of the component of the polarization direction of the probe signal (i.e., the resultant time varying vector sum magnitude of the probe components along x and y axes of propagation) that lies along the analyzer output (or "fast" or transmission) axis. For example, if the analyzer transmission axis is configured to pass a signal with a polarization direction of −45° from the positive x axis, i.e., 90° from the polarization of the probe input signal, the output of the analyzer will be zero (when the pump pulse is not present) because no component of the resultant magnitude vector from the x and y component waves lies along the analyzer transmission axis.

When the pump pulse is present, the index of refraction in the x direction ($n_x$) will not equal the index of refraction in the y direction ($n_y$) due to the aforementioned optical Kerr effect. The change in $n_x$ will cause a change in the propagation time for the x-axis wave component of the probe signal thereby causing the component to be shifted out of phase from the y-axis wave component of the probe signal (whose index of refraction was unchanged by the presence of the pump pulse). This phase shift produces a new vector sum of the probe wave components at the output end of the fiber, i.e., a new polarization of the probe signal, that is shifted from the probe polarization that existed when the pump was not present, the polarization change being related to the amount of phase shift caused by the induced change in refractive index. Therefore, when the pump pulse is present, the Kerr effect induces a change in polarization of the exiting probe signal.

Ideally, the polarization change of the probe due to the pump is 90° thereby becoming exactly parallel with the analyzer transmission axis and providing full probe signal strength at the analyzer output. If the polarization change is less than 90°, then the maximum signal strength will be less than the input probe signal strength because the component of the polarization along the analyzer transmission axis is a smaller magnitude. Thus the pump induced change in polarization of the probe signal allows a predefined portion of the probe signal intensity to be transmitted through the analyzer.

If a 90° polarization change is achieved when the pulse is present, the analyzer output will represent a sample of the probe signal (i.e., the value of the probe signal input when the pump pulse occurs). However, when the pump pulse goes to zero, the polarization change is zero and the analyzer output goes to zero. Therefore, the Kerr shutter provides a signal which represents the input signal optically sampled at the rate (frequency) at which the pump pulses occur.

The optical Kerr shutter behaves similarly to an electronic sampler of an analog signal where the signal to be sampled is the probe and the sampler is driven by the pump. If the Kerr shutter output reproduces the full power of the input signal at each sample, it is known as 100% Kerr modulation (or 100% probe transmission), i.e., 100% of the probe signal power is reproduced at the output. The Kerr shutter may also be viewed as a wavelength converter because it converts a pulsed optical input signal (pump) at one wavelength ($\lambda p$) to a pulsed (sampled) output signal (probe) at a different wavelength ($\lambda s$). The optical Kerr shutter described herein is similar in principle to that described in the article: Ken-ichi Kiayama et. al., "Optical Sampling Using an All-fiber Kerr Shutter", *Appl. Phys. Lett.*, American Institute of Physics, Vol. 46, No. 7, (April 1985).

In optical fiber communications and optical switching it is desirable to achieve a controlled pulsed signal at a desired wavelength, e.g., telephone communications, cable television, and optical computing.

In the past, to provide this function, devices have used two optical signals; the pump and the probe (as previously discussed), thus requiring two signals to produce one. Furthermore, the pump power was only used to drive the optical Kerr shutter and discarded at the output end of the fiber, thereby wasting optical pump power.

DISCLOSURE OF INVENTION

Objects of the invention include provision of a pulsed optical signal at a desired wavelength which requires only one optical input signal (a pump) and utilizes the pump power to provide wavelength conversion.

According to the present invention, a desired wavelength output signal is provided by applying a pulsed optical pump signal polarized along one axis of propagation of a polarization preserving optical waveguide and also applying, to such waveguide, a continuous probe signal at the desired output wavelength (different from the pump) polarized partially along the pump axis, from a laser driven by the optical pump signal at the output end of the waveguide.

The pulsed pump signal and continuous probe signals together operate as an optical Kerr shutter which permits the probe signal to pass to the output when the pump is present thereby providing a pulsed optical output signal at the wavelength of the probe and the pulse rate of the pump, just as in the known case where a separate pump is used. However, the invention represents a significant improvement over previous methods by providing a pulsed output of a desired wavelength and magnitude requiring only one input (a pulsed optical pump), i.e., not both a pump and a probe input, by utilizing normally discarded pump power in an optical feedback arrangement.

The foregoing and other objects, features and advantages of the present invention will become more apparent in the light of the following detailed description of exemplary embodiments thereof, as illustrated in the accompanying drawings.

BRIEF DESCRIPTION OF THE DRAWINGS

FIG. 2 is a diagram of a birefringent optical fiber showing the x-axis and y-axis index of refraction of the medium and the signal components propagating along each axis, in accordance with the present invention, including the following illustrations:
  (a) is a vector diagram showing the polarization of the pump pulse and the probe signal and the components of the probe signal polarization along the x-axis and y-axis at the fiber input; and
  (b) is a vector diagram showing the polarization of both the pump pulse and the probe signal before and after propagation through the fiber and the components of the probe signal polarization along the x-axis and y-axis at the fiber output.

FIG. 3 is a diagram of optical waveform components at the fiber output, traveling along the x-axis both with and without the pump pulse applied, in illustration (a); and traveling along the y-axis, showing no effect on the y-axis signal component due to a pump pulse applied in the x-axis direction, in illustration (b).

FIG. 4 is a partial schematic block diagram of an alternative embodiment using a wave plate to set the polarization of the input probe signal from the laser.

FIG. 5 is a partial schematic block diagram of an alternative embodiment using a wave plate to add phase shift to the Kerr shutter.

BEST MODE FOR CARRYING OUT THE INVENTION

Figure 1:
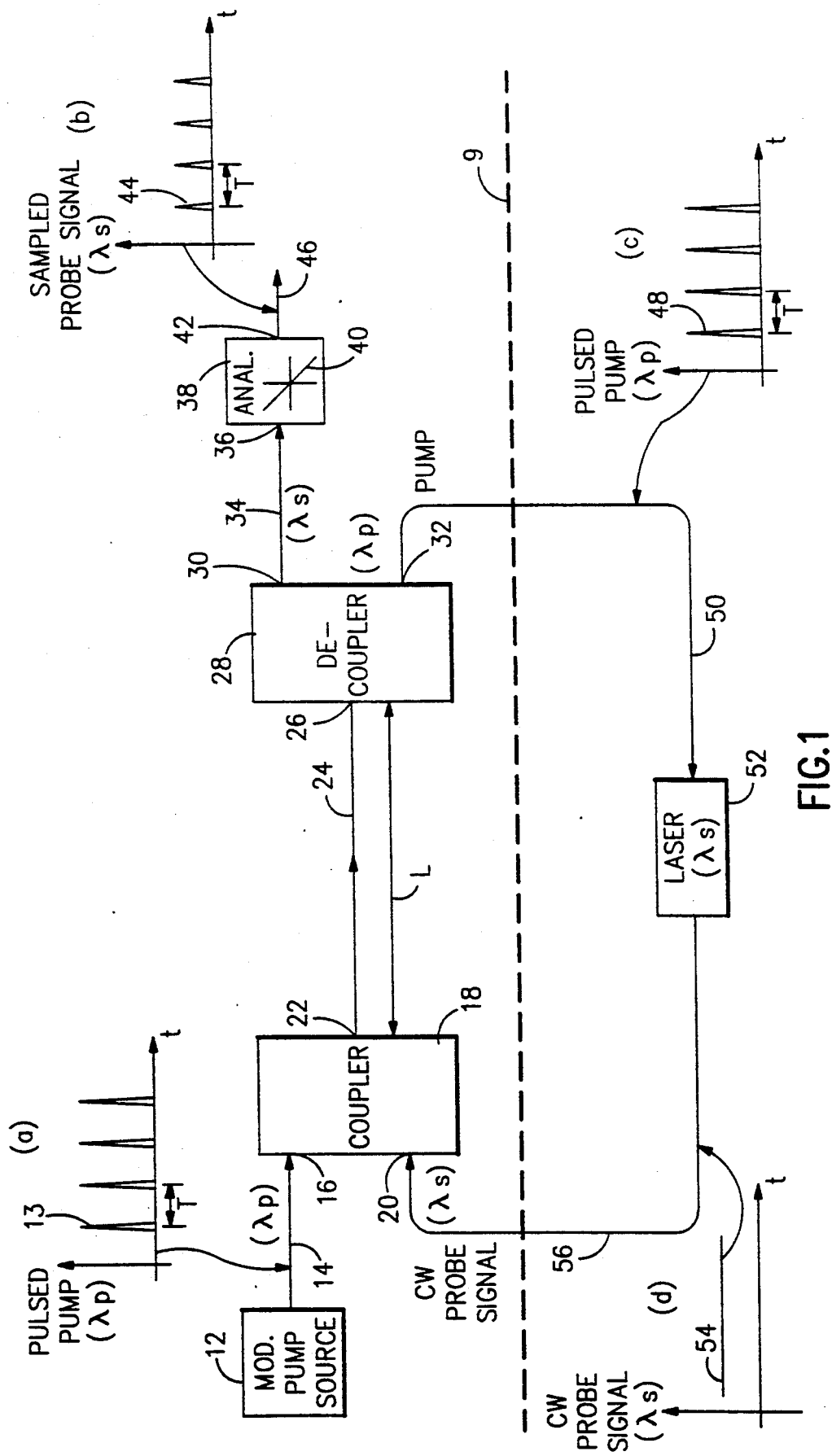
FIG. 1 is a schematic block diagram of an integrated fiber laser/Kerr shutter pulsed (modulated) optical source in accordance with the present invention, including the following illustrations:
  (a) is a diagram of the input pulsed pump waveform and timing of the pulses from the modulated pump source;
  (b) is a diagram of the sampled (pulsed) probe output signal waveform and the timing between pulses;
  (c) is a diagram of the pulsed pump output waveform and the timing between the pulses from the decoupler at the output of the Kerr shutter; and
  (d) is a diagram of the continuous wave optical probe input signal provided by the laser used and the input to the Kerr shutter.

Referring to FIG. 1, the configuration above the line 9 is a known optical Kerr shutter (minus the probe source) which is part of the present invention. An integrated Kerr shutter and fiber laser modulated optical source includes a pulsed (modulated) optical pump source 12, e.g., a Spectra Diode Labs laser diode, part #SDL-6300, driven by a high speed pump laser diode driver, which provides optical pulses at a given wavelength $\lambda p$), e.g., 980 nanometers (nm), and power, e.g., 50 milliwatts (mw) continuous wave (i.e., constant intensity). A pulsed pump 13 (FIG. 1, illust.(a)) is provided by the source 12 at a periodic pulse rate 1/T (e.g., 1 gigahertz) and is linearly polarized. Other pump wavelengths, pulse rates, and powers may be used if desired. Light from the pump source 12 is optically coupled by known polarization preserving means, e.g., through a polarization preserving optical fiber 14, to a port 16 of a known polarization preserving optical wavelength coupler 18, e.g., Canadian Research part no. 904PN, capable of accepting the wavelength of the optical pump. The diode power will likely be higher than the power of the pulsed pump 13 (FIG. 1, illust.(a)) in the fiber 14 due to losses (e.g., 50%) from coupling into the fiber 14. However, the pulsed pump 13 in the fiber 14 exhibits minimal losses through the system.

The optical wavelength coupler 18, as is known, accepts a first optical input signal at the port 16 and a second optical signal at a port 20, the first and second signals having different wavelengths and different directions of polarization, and couples a known portion of the first signal (approximately 100%) onto the second signal, the combined signal being provided to an output port 22. The first signal is the pulsed "pump" 13 which is linearly polarized and has a wavelength $\lambda p$ and the second signal is a continuous-wave (CW) "probe" with a wavelength $\lambda s$ having approximately constant power, e.g., 3 mw, and is linearly polarized in a direction different from the polarization of the pump (typically 45° from the pump).

The combined optical signal is passed through a known polarization preserving optical fiber 24 (i.e., a fiber that prevents any polarization change in the absence of the pump by preventing the x and y axis wave components from scrambling), e.g., the fiber discussed in the article: I. H. White et. al., "Demonstration of the Optical Kerr Effect in an All-fiber Mach-Zehnder Interferometer at Laser Diode Powers", Electronics Letters Vol. 24, No. 6, (1988), pg 340, having a known length L (e.g., 400 meters), to a port 26 of an optical decoupler 28. Other lengths may be used if desired, however the length must be chosen to provide the desired polarization change.

Referring to FIG. 2, the polarization preserving fiber 24 acts on the combined light, as is known, in accordance with the aforementioned optical Kerr effect. Typically, the pulsed pump 13 (FIG. 1, illust.(a)) is polarized in a direction 100 parallel to the x-axis and the probe signal is polarized in a direction 102 at an angle $\alpha$ (ideally 45°) from the pump, having a component Sx along the x-axis and a component Sy along the y-axis, as shown in FIG. 2, illust.(a). The combined light is launched into the input end 104 of the fiber 24 which preserves the polarization of light for its entire length. Thus, the pump and the Sx component of the probe co-exist in the x direction and the Sy component exists by itself in the y direction for the length L of the fiber 24.

Referring to FIG. 3, when the pump is not present the probe signal components Sx,Sy (FIG. 3, illusts.(a) and (b), respectively) will be in phase (a phase difference of 0°) as they propagate through the medium to the output end 106 of the fiber 24, shown by output waveforms 108,110 respectively, and the output polarization direction 111 (FIG. 2, illust.(b)) of the probe is the same as the input polarization direction 102 (FIG. 2, illust.(a)). The vectors Sx,Sy of FIG. 2, illustrations a and b, represent the intensity of the time varying optical signals (FIG. 3, illusts.(a) and (b)) at a common point in time 112 (typically at the peak intensity of one wave).

It is known that the propagation time $\tau$ for a light wave to travel through a medium with an index of refraction n, having length L, is:

$$\tau = nL/C \qquad (eq.1)$$

where C is the speed of light in a vacuum. When the pump 13 is present, as is known, it induces a change in the index of refraction in the x direction ($n_x$) by the Kerr effect, thereby changing the propagation time of the component Sx shown by an output waveform 114 (FIG. 3, illust.(a)) and inducing a phase shift between the Sx and Sy components at the fiber output. It is known that the amount of phase shift induced (i.e., change in propagation delay) due to the pump induced change in index of refraction along an axis, can be adjusted by changing the pump strength and/or changing the length of the fiber. Thus, if more phase shift is desired, the pump strength can be increased or the fiber length increased, or both.

If the phase shift induced in the component Sx is half the period $T_0$, the Sx vector (FIG. 2, illust.(b)) is shifted 180° and the output polarization is in a direction 116, 90° from the output polarization 111 when no pump pulse is present. Instead of using an angle of 45° between the pump and probe polarization directions at the input to the Kerr shutter, other angles may be used; however, the maximum output strength from the analyzer will be attenuated. Thus, 45° is the optimal value for the angle $\alpha$ to provide full probe power at the analyzer output.

In FIG. 1, the combined light exits the fiber 24 and enters a port 26 of an optical decoupler 28, e.g., Canadian Research part no. 904PN (the same part no. as the coupler 18 may be used, as is known). The decoupler 28, as is known, accepts light at the input port 26 consisting of two wavelengths, e.g., $\lambda p$ and $\lambda s$, decouples the wavelengths to output ports 30,32 providing light of only one wavelength at each output port: e.g., $\lambda s$ (probe) is provided at the port 30 and $\lambda p$ (pump) is provided at the port 32. The probe signal from the port 30 of the optical decoupler 28 is optically coupled by known polarization preserving means, e.g., a polarization preserving optical fiber 34, to a port 36 of a known analyzer 38 (or polarizer), e.g., a fiber polarizer, such as a PANDA fiber wound around a bobbin with a predetermined radius as described in the aforementioned Ken-ichi Kiayama, et. al. article. The fiber polarizer may alternatively be connected directly to the output port 30 of the decoupler eliminating the need for the optical fiber 34.

The analyzer 38, as is known, passes the component of the input light polarization that lies along an output (or "fast" or transmission) axis 40 of the analyzer to the output port 42. If the analyzer transmission axis 40 is set at a angle of 45° between the positive x axis and negative y axis, the analyzer will pass the probe input signal when the pump pulse 13 (FIG. 1 illust.(a)) is present and pass no signal when the pump pulse 13 is off, thereby providing a pulsed (modulated) probe output signal 44 (FIG. 1, illust.(b)). The pulsed probe output signal 44 may be coupled by known means, e.g., an optical fiber 46, to an optical communications link (not shown) or to other applications.

The pulsed pump 48 (FIG. 1, illust.(c)) from the port 32 of the optical decoupler 28 is optically coupled by known means, e.g., an optical fiber 50, with the same time T between pulses as the input pump but with a lower power due to losses caused by coupling, to a known laser 52, such as an optical fiber laser made from rare earth (e.g., erbium) doped optical fiber between intracore Bragg reflectors (located in the fiber at both ends) that act as the laser mirrors, similar to the fiber laser described in the article: G. A. Ball et. al., "$Nd^{3+}$ Fiber Laser Utilizing Intra-core Bragg Reflectors", *Electronics Letters*, Vol. 26, (1990), pg. 1829.

A laser, as is known, provides an output light signal at a given wavelength (defined by the laser cavity material and geometry) and power in response to a pump input signal. The pump raises the energy level of (excites) the electrons within the laser. When the electrons return to their original energy level (either by stimulation or spontaneously on their own) they emit photons thereby producing light of a different wavelength than that of the pump. The average length of time the electrons remain in a stable excited energy level before making a spontaneous transition (that emits radiation) is called the metastable lifetime and is typically in the millisecond (msec) range, e.g., 10 to 15 msec, for an erbium laser. If the pump is pulsed at a rate much faster than the metastable lifetime the optical output signal of the laser will be continuous, also known as continuous wave (CW). It is also required that the average pump power remain substantially constant and desirable that the laser operates in a single longitudinal mode (i.e., provides an output signal with only one wavelength). While a single longitudinal mode laser is desirable, a multimode laser (one that provides a plurality of wavelengths) may also be used.

The invention uses the pulsed pump 48 (FIG. 1, illust.(c)) from the decoupler 28 to drive the laser 52 which provides CW optical output radiation 54 (FIG. 1. illust.(d)) at a wavelength determined by the material and geometry of the laser (e.g., erbium may produce a wavelength of 1.55 nanometers, a wavelength common in the communications industry) which is coupled by known polarization preserving means, e.g., a polarization preserving optical fiber 56, to the input port 20 of the optical coupler 18 and is used as the aforementioned CW probe input signal.

Thus, the invention provides a feedback loop for the optical pump energy, after it has been used to pulse the Kerr shutter, to create the CW probe signal (of a different wavelength than the pump) that ultimately gets sampled by the shutter, thereby providing wavelength conversion using only the pulsed (modulated) pump signal as an input and providing a high percentage transmission of the input probe power in a modulated output signal.

It should be understood by those skilled in the art that all optical components described herein (i.e., optical fibers, coupler, and decoupler) must be single transverse mode elements.

It is known that linearly polarized light (such as that shown in FIG. 2, illust.(a) and (b)) provides the most efficient use of the Kerr shutter by allowing maximum use of the pump power and by transmitting maximum probe power through the analyzer to the output. It is also known that to obtain linearly polarized light at the input to the analyzer 38 when linearly polarized light is input to the Kerr shutter, the phase shift introduced between the two waves must be exactly 180° (or a multiple thereof). If 180° shift is not achieved, the linearly polarized input light will become circularly polarized (if the phase shift is 90° or an odd integer multiple thereof) or elliptically polarized (if other than 90° or an integer multiple thereof) and the efficiency of the Kerr shutter (and the output probe power) will not be optimized. Thus, the phase shift between the components not only manifests itself as a change in the direction of polarization, but also as a change in the shape of the polarization (i.e., linear, circular, or elliptical) and has an effect on shutter performance. The behavior is similar to a Lissajous pattern on an oscilloscope where signals (such as the components Sx,Sy) are plotted against each other.

If the pump strength and fiber length do not provide 180° of phase shift between probe components (i.e., a 90° change in linear polarization), a wave plate may be used to increase the phase shift. A wave plate, as is known, is an optical device used to rotate (change) the polarization of an incident light wave by shifting a component of the incident signal (in a similar manner as the Kerr shutter, except with permanent birefringence). For example, a quarter-wave plate may create a differential phase shift of up to 90° between the wave components of the incident wave. A quarter-wave plate 58 (FIG. 4), such as an OZ Optics Ltd Fiber Optic Polarization Rotator, part no. series FPR-11-11-1550, may be placed in line with the optical fiber 34 at the input to the analyzer 38, to provide this additional polarization change of the probe signal (if needed) to achieve the desired linearly polarized light in the direction 116 (FIG. 2, illust.(b)). It should be understood by those skilled in the art that other techniques may be used to provide the additional phase shift to the Kerr shutter. Also, the additional phase shift may be placed anywhere within the Kerr shutter where both components of the probe exist. Alternatively, the wave plate may be incorporated internal to the analyzer.

It should be understood that an additional polarization rotating device in the Kerr shutter (such as a wave plate) causes the shutter efficiency to be compromised by either not providing full probe power at the output when the probe is present or not providing zero power at the output when the pump is not present, because the added polarization shift is a constant (with or without the pump pulse).

If the polarization of the continuous-wave probe signal provided by the laser 52 is not aligned 45° from the pump polarization, a half wave plate 59 (FIG. 5) may be placed in line with the optical fiber 56 at the input of the coupler 18, to provide this polarization. Other techniques may be used to set the probe polarization if desired.

Even though the pulse width of the pulsed (modulated) pump input signal is shown as a spike of minimal duration (e.g., 0.1 nanosecond), it should be understood by those skilled in the art that the pulse width may be set at any duty cycle desired and the output probe pulse width will change accordingly. Furthermore, the pulse width and frequency are limited solely by the switching ability of the power supply that drives the laser diode and not by the optical portion of the invention.

The fiber laser 52 may likely be connected directly between the decoupler output port 32 and the coupler input port 20, thereby eliminating the need for the optical fibers 50 and 56. Also, instead of implementing the invention using optical fibers 14, 34, 46, 50, 56, to transmit optical signals, the invention will work equally well using free space and mirrors to transmit the optical signals around the loop.

Although it is possible to create a polarization preserving fiber that has substantially the same index of refraction along both axes ($n_x$ equals $n_y$) when no pump is present (e.g., by taking two fibers of equal length and splicing them together such that opposite axes are butted against each other), the fiber may likely have a known initial birefringence (i.e., $n_x$ is not equal to $n_y$). In that case, the initial birefringence introduces a slight phase shift between the components which is compensated for in the length and power considerations of the design (e.g., less power or length will be required to achieve the desired probe polarization change).

Also, instead of using a fiber optic laser the invention will work equally as well with any laser which can be optically pumped and that produces radiation at the desired wavelength such as a neo-dymium:yttrium aluminum garnet (Nd:YAG) laser which provides an output wavelength of 1.064 μm (microns). Furthermore, lasers with other wavelengths and metastable lifetimes may be used. However, the laser must provide an output wavelength that matches the desired wavelength for the probe, and the metastable lifetime must be sufficiently longer than the time between pump pulses to insure a CW probe is provided.

Furthermore, although the invention is described as aligning the probe polarization such that in the absence of the pump beam the probe is not transmitted through the analyzer, it should be understood by those skilled in the art that the probe signal may also be aligned such that the inverse occurs (i.e., the probe is transmitted through the analyzer only when the pump is not present), or any alignment variation thereof.

Although the invention has been described and illustrated with respect to exemplary embodiments thereof, it should be understood by those skilled in the art that various changes, omissions and additions may be made without departing from the spirit and the scope of the invention.

I claim:

1. An integrated Kerr shutter and fiber laser modulated optical source, comprising:
   pump means for providing a pulsed optical input pump signal having a first wavelength and a first polarization and having a time period between pulses and pump pulse width;
   continuous wave means, responsive to an output pump signal, for providing an optical continuous-wave input probe signal having a second wavelength and a second polarization different from said first wavelength and said first polarization of said input pump signal, respectively;
   coupling means for providing a combined optical signal by combining said input pump signal and said input probe signal;

polarization changing means, responsive to said combined optical signal, for providing a polarization alterable probe signal as part of said combined optical signal having a first polarization when said input pump siqnal is not present and having a second polarization when said input pump signal is present and providing an output pump signal as part of said combined optical signal having traveled through said polarization changing means and having substantially the same timing and power as said input pump signal;

decoupling means, responsive to said combined optical signal from said polarization changing means, for separating said combined optical signal into said polarization alterable probe signal and said output pump signal; and analyzer means, responsive to said polarization alterable probe signal, for providing an optical output probe signal indicative of a component of the polarization of said polarization alterable probe signal.

2. Apparatus of claim 1 wherein said component provided by said analyzer means comprises the component of said polarization alterable probe signal that lies along the output (transmission) axis of said analyzer.

3. Apparatus of claim 1 Wherein said polarization changing means changes the polarization direction of said input probe signal by substantially 90° when said input pump signal is present and changes the polarization direction of said input probe signal by substantially 0° when said input pump signal is not present.

4. Apparatus of claim 1 wherein said continuous wave means comprises a laser having a monostable lifetime significantly longer than said time between pulses of said input pump signal.

5. Apparatus of claim 1 wherein said continuous wave means comprises a laser having one output wavelength (single mode).

6. Apparatus of claim 1 wherein said output pump signal has an average power than remains substantially constant over time.

7. Apparatus of claim 4 wherein said laser comprises a solid state laser.

8. Apparatus of claim 1 further comprising a wave plate, disposed between said continuous wave means and said coupling means, capable of providing said polarization of said input probe signal.

9. Apparatus of claim 1 further comprising a wave plate, disposed between said decoupling means and said analyzer means, capable of rotating the polarization of said polarization alterable probe signal independent of the said pump signal.

* * * * *